United States Patent
Zhang et al.

(10) Patent No.: US 12,149,268 B2
(45) Date of Patent: Nov. 19, 2024

(54) TERAHERTZ FULL-DUPLEX CO-LOCAL OSCILLATOR SOLID-STATE FRONT-END TRANSMITTING CIRCUIT

(71) Applicant: Univ. Electronic Science and Technology of China, Chengdu (CN)

(72) Inventors: Bo Zhang, Chengdu (CN); Zhongqian Niu, Chengdu (CN); Xiaobo Yang, Chengdu (CN); Yinian Feng, Chengdu (CN); Yi Hu, Chengdu (CN); Bingli Dai, Chengdu (CN); Jicong Zhang, Chengdu (CN); Yong Fan, Chengdu (CN); Yihong Su, Chengdu (CN); Hongbin Wang, Chengdu (CN); Yafei Wu, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 182 days.

(21) Appl. No.: 18/146,428

(22) Filed: Dec. 26, 2022

(65) Prior Publication Data

US 2023/0238990 A1 Jul. 27, 2023

(51) Int. Cl.
| | |
|---|---|
| *H04B 1/04* | (2006.01) |
| *H01Q 13/08* | (2006.01) |
| *H04B 1/03* | (2006.01) |
| *H04L 5/14* | (2006.01) |

(52) U.S. Cl.
CPC .......... *H04B 1/0458* (2013.01); *H01Q 13/08* (2013.01); *H04B 1/03* (2013.01); *H04L 5/14* (2013.01)

(58) Field of Classification Search
CPC ........ H04B 1/0458; H04B 1/03; H04B 1/403; H04B 1/04; H01Q 13/08; H04L 5/14; H03D 7/165; H01P 5/18
See application file for complete search history.

(56) References Cited

U.S. PATENT DOCUMENTS

| | | | | |
|---|---|---|---|---|
| 4,215,313 | A * | 7/1980 | Chang | H03D 9/0641 333/228 |
| 8,035,083 | B1 * | 10/2011 | Kozlov | G01J 3/108 250/341.1 |
| 8,748,822 | B1 * | 6/2014 | Gerecht | G01N 21/3586 250/339.07 |
| 12,057,891 | B2 * | 8/2024 | Jain | H04B 1/525 |
| 2019/0331852 | A1 * | 10/2019 | Uchida | G02B 6/125 |
| 2020/0201946 | A1 * | 6/2020 | Zhang | G06F 30/00 |
| 2022/0014226 | A1 * | 1/2022 | Kim | H01P 5/19 |

(Continued)

*Primary Examiner* — Andrew Wendell
(74) *Attorney, Agent, or Firm* — Andrew D. Fortney; Central California IP Group, P.C.

(57) ABSTRACT

A terahertz full-duplex co-local oscillator solid-state front-end transmitting circuit is disclosed, which belongs to the technical field of terahertz communication. The overall structure of the solid-state front-end transmitting circuit adopts a new system, wherein the circuit comprises two branches that are parallel and driven by a local oscillator source. A branched waveguide directional coupler is configured to output two driving signals provided by the same local oscillator source respectively to two branch circuits with required powers. Two transmission signals generated from the two branches are combined into one signal for transmission through an orthogonal mode coupled duplexer, so as to fulfill the construction of a full-duplex co-local oscillator solid-state front-end transmission circuit.

18 Claims, 4 Drawing Sheets

(56) References Cited

U.S. PATENT DOCUMENTS

| | | | | |
|---|---|---|---|---|
| 2022/0109241 A1* | 4/2022 | Li | ............................ | H03D 9/02 |
| 2023/0112230 A1* | 4/2023 | Gilson | ............... | H04B 7/18506 |
| | | | | 455/14 |
| 2023/0144500 A1* | 5/2023 | Mann | ....................... | H03D 7/02 |
| | | | | 333/204 |
| 2023/0238997 A1* | 7/2023 | Zhang | ................... | H03B 19/10 |

* cited by examiner

TERAHERTZ FULL-DUPLEX CO-LOCAL OSCILLATOR SOLID-STATE FRONT-END TRANSMITTING CIRCUIT

TECHNICAL FIELD

The invention belongs to the technical field of terahertz communication, and relates to a front-end transmitting circuit, in particular to a terahertz full-duplex co-local oscillator solid-state front-end transmitting circuit.

BACKGROUND

The traditional front-end transmitting circuit adopts different branches for different functions, because the driving signals between different branches are different. If they are directly integrated, strong circuit mutual interference will occur, and the system performance will deteriorate. In the terahertz frequency band, the high-frequency effect of semiconductor devices is particularly prominent, and the miniaturized integrated circuit structure will further increase the mutual interference between the two branch circuits. However, as the demand increases, how to design a duplex architecture so that the transmitting front-end circuit can realize dual-branch parallelism and share the local oscillator source has become a key to much research.

SUMMARY

In view of the problems existing in the background technology, the object of the present invention is to provide a terahertz full-duplex co-local oscillator solid-state front-end transmitting circuit. The solid-state front-end transmitting circuit of the present invention includes a duplex structure using branched waveguide directional couplers and orthogonal mode coupled duplexers, and realizes the parallelization of two branches with different requirements, so that two branches driven by different signal sources can be directly integrated and does not generate mutual interference between circuits, which is beneficial to the development of integrated circuits.

To achieve the above objects, the technical scheme of the present invention is as follows:

A terahertz full-duplex co-local oscillator solid-state front-end transmitting circuit, comprising: a local oscillator tripler having a first output terminal and a first input terminal, a branched waveguide directional coupler having a first local oscillator input terminal, a coupling terminal and a through terminal, a terahertz subharmonic mixer having a second local oscillator input terminal, a second input terminal and a second output terminal, a terahertz doubler having a third input terminal, a fourth input terminal and a third output terminal, an orthogonal mode coupled duplexer having a fifth input terminal, a sixth input terminal and a fourth output terminal, and a transmitting antenna; wherein the first output terminal is connected to the first local oscillator input terminal of the branched waveguide directional coupler; the coupling terminal of the branched waveguide directional coupler is connected to the second local oscillator input terminal of the terahertz subharmonic mixer, and the through terminal of the branched waveguide directional coupler is connected to the third input terminal of the terahertz doubler; the second output terminal of the terahertz subharmonic mixer is connected with the fifth input terminal of the orthogonal mode coupled duplexer; the third output terminal of the terahertz doubler is connected with the sixth input terminal of the orthogonal mode coupled duplexer; the fourth output terminal of the orthogonal mode coupled duplexer is connected with the transmitting antenna; the local oscillator tripler is configured to double a frequency of a drive signal from a local oscillator, and then transmit the frequency-doubled drive signal to the branched waveguide directional coupler; the branched waveguide directional coupler is configured to divide the frequency-doubled driving signal into a first power signal having a first power and a second power signal having a second power different from the first power; the terahertz doubler is configured to receive and multiply a frequency of the first power signal to generate a first branch transmission signal; the terahertz subharmonic mixer is configured to receive the second power signal and mix the second power signal with an input intermediate frequency signal to generate a second branch transmission signal; and the orthogonal mode coupled duplexer is configured to receive the first branch transmission signal and the second branch transmission signal respectively at the fifth input terminal and the sixth input terminal, combine the first and the second branch transmission signals into a single transmission signal, and provide the single transmission signal to the transmitting antenna.

In one embodiment, the terahertz full-duplex co-local oscillator solid-state front-end transmitting circuit further comprises a twisted waveguide connected to one of the fifth and sixth input terminals, so that one of the first and second branch transmission signals has a polarization mode that is mutually orthogonal to the other of the first and second branch transmission signals.

In another embodiment, the second power signal has a power of less than or equal to 4 mW; and the first power signal has a power greater than 100 mW.

In other or further embodiments, the local oscillator tripler includes (i) a waveguide having a third local oscillator input terminal and (ii) a microstrip line. The third local oscillator terminal may receive the driving signal, and the waveguide may couple the driving signal to the microstrip line (e.g., for frequency doubling). The waveguide may comprise a standard WR-28 waveguide.

In other or further embodiments, the branched waveguide directional coupler comprises an H-shaped waveguide with two primary paths and a central section. The two primary paths may each comprise a rectangular waveguide, and the two rectangular waveguides may have four ports, which may be an input port, a coupling port, a through port and an isolation port. The central section may comprise a pair of split columns with a trapezoidal section, configured symmetrically along the midline of the central section. The split columns may have a lower bottom and an upper bottom, connected by a combination of a straight line and a circular arc that are vertical to the lower bottom, and the upper bottom is close to the center line of the central section. The input port may be connected with the output terminal of the local oscillator tripler, the coupling port may be connected with the local oscillator input terminal of the terahertz subharmonic mixer, and the through port may be connected with the input terminal of the terahertz doubler.

In another embodiment, the terahertz subharmonic mixer comprises a radio frequency transition structure, an antiparallel diode pair and a local oscillator duplexer. The radio frequency transition structure may comprise a radio frequency waveguide, a radio frequency matching circuit, a radio frequency probe, a local oscillator duplexer, a local oscillator waveguide probe, a local oscillator low pass filter, an intermediate frequency low pass filter and a local oscillator matching circuit.

An intermediate frequency (IF) signal may be input from or to the input port of the intermediate frequency low-pass filter, and then transmitted to the local oscillator waveguide probe. The local oscillator waveguide probe may transmit the intermediate frequency signal together with a second power signal input from the local oscillator port of the local oscillator waveguide to the local oscillator low-pass filter. The combined signals may then be transmitted to the anti-parallel diode pair through the local oscillator matching circuit. The anti-parallel diode pair may be configured to mix the intermediate frequency signal and the second power signal to generate the second branch transmission signal. The second branch transmission signal may be transmitted to the RF (radio frequency) waveguide probe through the RF matching circuit, which may be next to an RF waveguide through the RF waveguide probe, and then may be output to the input port of the orthogonal mode duplexer. Among them, the local oscillator low-pass filter may be configured to prevent the RF signal leaking from the local oscillator port, and the intermediate frequency (IF) low-pass filter may be configured to filter out spurious components (e.g., having a frequency below a predetermined threshold frequency) in the IF signal.

In more embodiments, the terahertz doubler may include an input transition structure, an output transition structure, a Schottky varactor diode, and a bias circuit. The input transition structure may comprise an input waveguide, a height-reducing waveguide, an input probe and an input matching circuit. The output transition structure may comprise an output matching circuit, a suspended microstrip with or in a reduced shielding cavity and an output waveguide; the bias circuit is a low-pass filter.

The input waveguide may comprise a WR10 waveguide, and the input waveguide may be connected with a height-reduced WR10 waveguide. Half of the suspended microstrip with or in the reduced shielding cavity may be in the height-reduced WR10 waveguide, and the other half may extend outside the height-reduced WR10 waveguide and/or at the end of the microstrip line outside the waveguide. As a bias port, the center of the suspended microstrip with or in the reduced shielding cavity may be connected to the output waveguide. The output waveguide may comprise a WR5 waveguide, and the output matching circuit structure and low-pass filter may respectively be on opposite sides of the output waveguide. The Schottky varactor diode may have first and second sides (or an input and an output) that respectively comprise an input matching circuit and an output matching circuit.

A first power signal may enter the input waveguide through a local oscillator port, pass through the height-reducing waveguide and the input probe, transition to the input matching circuit, and then couple to the Schottky varactor diode through the input matching circuit (e.g., for frequency multiplication). The multiplied signal may then pass through the output matching circuit to the suspended microstrip (e.g., with or in the reduced shielding cavity), and then couples to the output waveguide (e.g., for output through the antenna). The low-pass filter may be configured to prevent the signal from leaking from or to the bias port.

The invention may also provide a method for using the terahertz full-duplex co-local oscillator solid-state front-end transmitting circuit in the integration of measurement, control and digital transmission, in which case the transmitting antenna may comprise a horn antenna, the driving signal may comprise a measure and control sweep signal, the higher power signal provides a driving signal for the terahertz duplexer in a measurement and control branch (e.g., of the front-end transmitting circuit), which may cause the terahertz duplexer to generate a high power output signal to extend the transmitting distance of a terahertz detecting system (e.g., including the front-end transmitting circuit). The transmission signal of the first branch may comprise a terahertz measurement and control signal. The lower power signal provides a local oscillator signal for the terahertz subharmonic mixer in the digital transmission branch (e.g., of the front-end transmitting circuit), which may cause the terahertz subharmonic mixer to work properly and conduct data transmitting, and the second branch transmitting signal may comprise a terahertz digital transmission signal.

The invention also provides a method of using the terahertz full-duplex co-local oscillator solid-state front-end transmitting circuit in the integration of communication and detection, in which case the transmitting antenna may comprise a terahertz phased array antenna, and the drive signal may comprise a frequency sweep signal (e.g., for detection). The first power signal may provide a drive signal for the terahertz doubler in the detection branch (e.g., of the front-end transmitting circuit), and the transmission signal of the first branch (e.g., of the front-end transmitting circuit) may comprise a terahertz detection signal. The second power signal may provide a local oscillator driving signal for the terahertz subharmonic mixer in a communication branch (e.g., of the front-end transmitting circuit), and the transmission signal of the second branch (e.g., of the front-end transmitting circuit) may comprise a terahertz communication signal.

In further embodiment, according to the method of using the terahertz full-duplex co-local oscillator solid-state front-end transmitting circuit in the integration of communication and detection, the front-end transmitting circuit also includes a power amplifier and a low noise amplifier. The power amplifier and the terahertz doubler are connected to the terahertz orthogonal mode coupled duplexer, and the power amplifier may be configured to amplify and process a frequency-multiplied output signal (e.g., the signal doubled by frequency multiplication) from the terahertz doubler, and the terahertz orthogonal mode coupled duplexer configured to receive the frequency-multiplied output signal from the power amplifier. The low noise amplifier may be connected with the terahertz subharmonic mixer and the terahertz orthogonal mode coupled duplexer, and the low noise amplifier may be configured to amplify the second branch transmission signal (e.g., the signal mixed by the terahertz subharmonic mixer). The terahertz orthogonal mode coupled duplexer may be configured to receive an amplified output signal from the low noise amplifier.

The mechanism of the present invention may relate to the overall structure of the transmitter adopting a novel system in which two branches are parallel and driven by a local oscillator source, and the branched waveguide directional coupler is configured to output the driving signals provided by the local oscillator source in two ways, respectively to the two branches to provide the drive signals with respective appropriate power levels. The two branches then generate output/drive signals and combine them into one signal for transmission through the orthogonal mode coupled duplexer, so as to build a full-duplex co-local oscillator solid-state front-end transmission circuit.

In summary, owing to above-mentioned technical scheme, the beneficial effects of the present invention may include:

The present invention innovatively includes a circuit implementation and/or design method for two branches driven by co-local oscillation and/or receiving the same local oscillation signal, which solves the limitation in the prior art, which relies on a baseband algorithm to realize multi-branch integration. At the same time, when the traditional approach realizes two functions at the same time, it needs two circuit subsystems and two antennas. In practical applications, the size of the antennas is often more than 10 cm×10 cm, and the inability to share the antenna greatly increases the area and/or volume of the system. The innovative structure of the present invention and the use of one antenna can fulfill two functions, and reduce the area and/or volume of the system.

EMBODIMENTS

In order to make the purpose(s), technical solution and advantages of the present invention clearer, the present invention will be further described in detail below in conjunction with the implementation methods and accompanying drawings.

Figure 1:
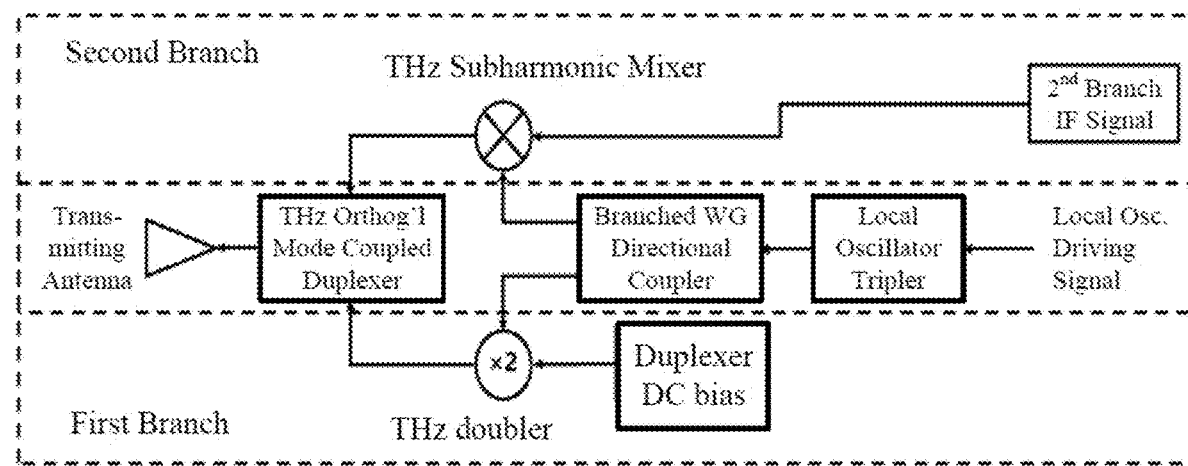
FIG. 1 is a circuit block diagram of an exemplary solid-state front-end transmitting circuit representative of the present invention.

A terahertz full-duplex co-local oscillator solid-state front-end transmitting circuit comprises a local oscillator tripler, a branched waveguide directional coupler, a terahertz subharmonic mixer, a terahertz doubler, and an orthogonal mode coupled duplexer and transmitting antenna. An exemplary circuit block diagram is shown in FIG. 1. The local oscillator tripler multiplies the frequency of the incoming local oscillator drive signal, and transmits the frequency-multiplied signal to the branched waveguide directional coupler to divide it into two signals with different powers: one signal with higher-power is transmitted to the terahertz doubler (e.g., for frequency doubling) to generate a first branch transmission signal, and the other signal with lower-power is transmitted to the terahertz subharmonic mixer, and at the same time an intermediate frequency signal is input to the terahertz subharmonic mixer, where it is mixed with the lower-power signal to generate a second branch transmission signal. The first branch transmission signal and the second branch transmission signal are combined into one signal in the orthogonal mode coupled duplexer, and the combined signal is transmitted through the transmission antenna.

Figure 2:
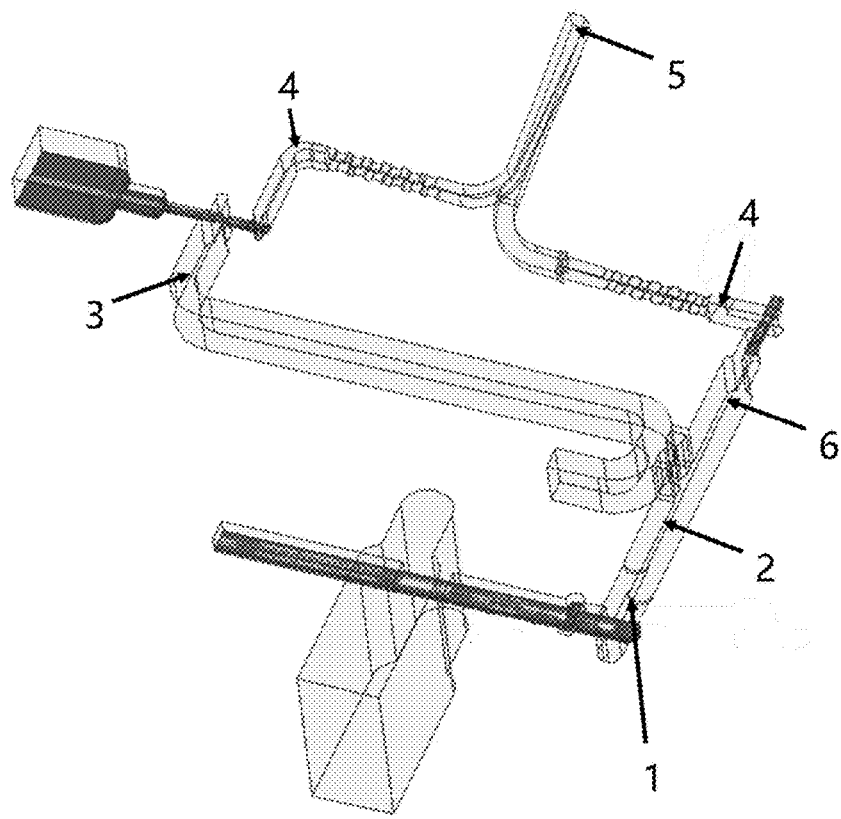
FIG. 2 is a schematic diagram of an exemplary circuit structure the solid-state front-end transmitting circuit representative of the present invention.

The overall structural diagram of the solid-state front-end transmitting circuit is shown in FIG. 2, where the output terminal (1) of the local oscillator tripler is connected to the local oscillator input terminal of the branched waveguide directional coupler (2), and the coupling terminal of the branched waveguide directional coupler (2) is connected to the input end (e.g., the local oscillator input) of the terahertz subharmonic mixer (6), and the through terminal (e.g., of the branched waveguide directional coupler 2) is connected to the input terminal of the terahertz doubler (3). The output terminal of the terahertz subharmonic mixer (6) is connected to the first input terminal of the orthogonal mode coupled duplexer (4), the output terminal of the terahertz doubler (3) is connected to the second input terminal of the orthogonal mode coupled duplexer (4), and the output terminal of the orthogonal mode coupled duplexer (4) is connected to the transmitting antenna (5).

Figure 3:
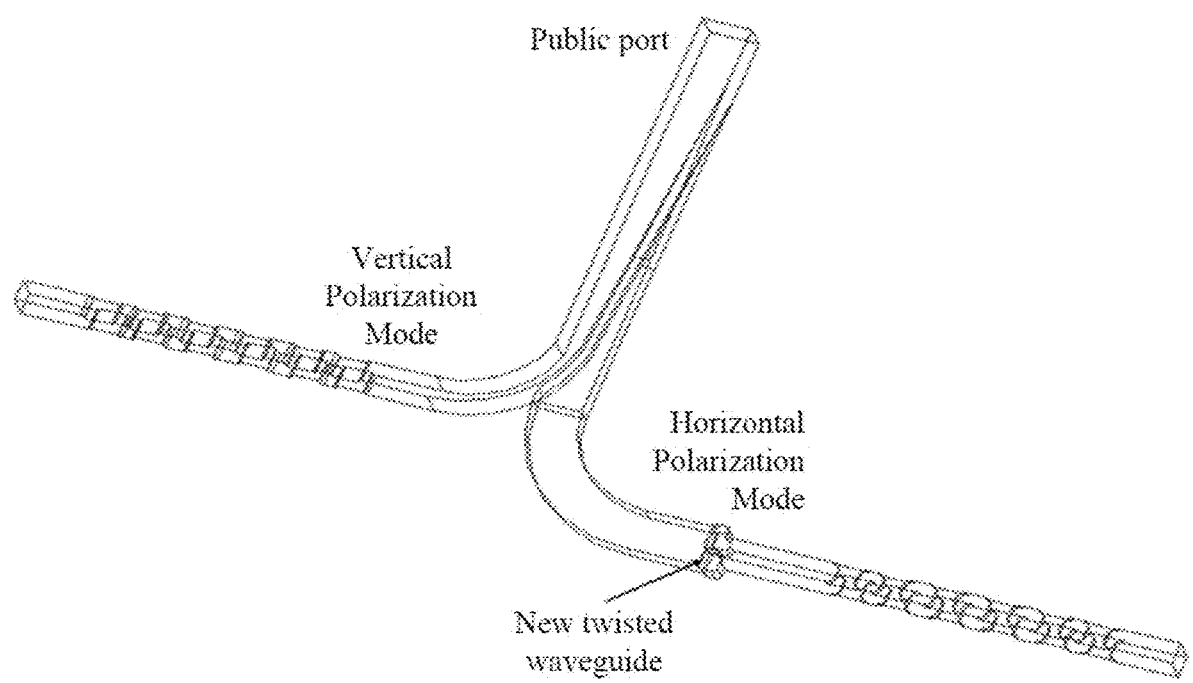
FIG. 3 is a schematic structural diagram of an exemplary orthogonal-mode coupled duplexer suitable for use in the present solid-state front-end transmitting circuit.

FIG. 3 is a schematic structural diagram of an exemplary orthogonal-mode coupled duplexer suitable for use in the solid-state front-end transmitting circuit of the present invention. The two input ports of the orthogonal mode coupled duplexer are respectively connected to the two branch circuits, and the public port is connected to the transmitting antenna. At the same time, one of the signal input ports is connected to a twisted waveguide, so that the two transmitting signals of the two branch circuits enter the public port, then their polarization modes are mutually orthogonal to each other.

Figure 4:
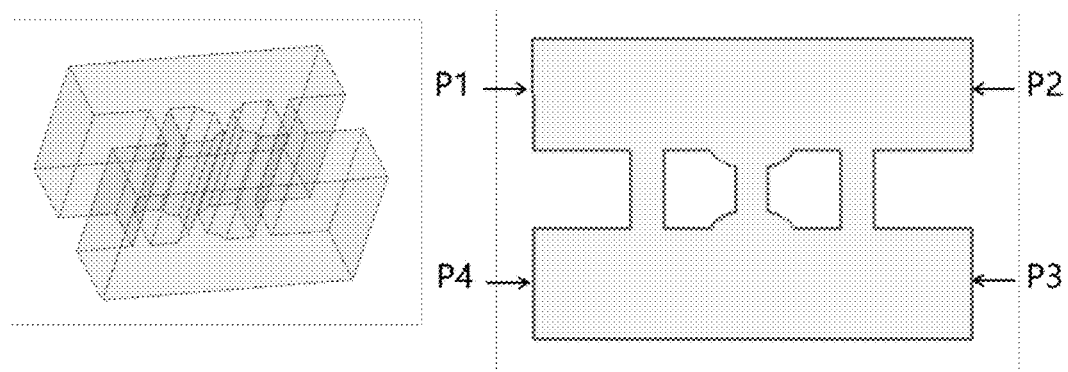
FIG. 4 is a schematic structural diagram of an exemplary branched waveguide directional coupler suitable for use in the present solid-state front-end transmitting circuit.

FIG. 4 is a schematic structural diagram of a branched waveguide directional coupler suitable for use in the solid-state front-end transmitting circuit of the present invention. The branched waveguide directional coupler comprises an H-shaped waveguide structure, having primary paths (e.g., between P1 and P2 and/or between P3 and P4) that comprise two rectangular waveguides, and the four ports (e.g., P1, P2, P3 and P4) of the rectangular waveguides comprise an input port, a coupling port, a through port and an isolation port. The coupler includes a pair of symmetrical split columns with a trapezoidal section along the midline in the central section. The split columns have a lower bottom and upper bottom, connected by a combination of a straight line and a circular arc that are vertical to the lower bottom. The upper bottom is close to the center line of the central section. The input port is connected with the output terminal of the local oscillator tripler, the coupling port is connected with the local oscillator input terminal of the terahertz subharmonic mixer, and the through port is connected with the input terminal of the frequency doubler.

Figure 5:
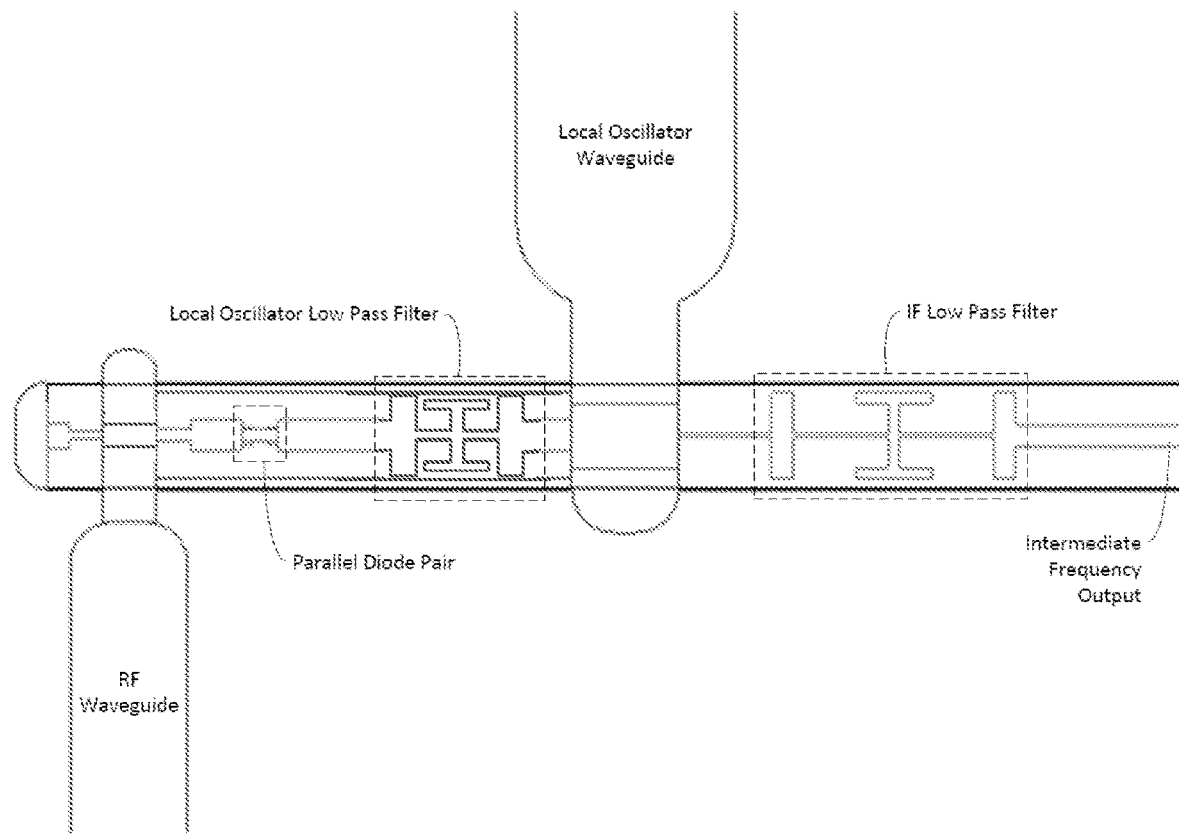
FIG. 5 is a specific circuit structure diagram of an exemplary 220 GHz quartz heterogeneous integrated subharmonic mixer.

FIG. 5 is a specific circuit structure diagram of an exemplary 220 GHz quartz heterogeneous integrated subharmonic mixer. The terahertz subharmonic mixer comprises a radio frequency (RF) transition structure, an anti-parallel diode pair and a local oscillator duplexer. The radio frequency transition structure comprises a radio frequency (RF) waveguide, a radio frequency (RF) matching circuit, a radio frequency (RF) probe, a local oscillator duplexer, a local oscillator waveguide probe, a local oscillator low pass filter, an intermediate frequency (IF) low pass filter and a local oscillator matching circuit.

An intermediate frequency (IF) signal is input from the input port of the intermediate frequency low-pass filter, and is then transmitted to the local oscillator waveguide probe. The local oscillator waveguide probe transmits the intermediate frequency signal together with a second power signal (input from the local oscillator port of the local oscillator waveguide) to the local oscillator low-pass filter, which is then transmitted to the anti-parallel diode pair through the local oscillator matching circuit. The anti-parallel diode pair is configured to mix the intermediate frequency signal and the second power signal to generate the second branch transmission signal. The second branch transmission signal is transmitted to the RF (radio frequency) waveguide probe through the RF matching circuit, next to the RF waveguide through the RF waveguide probe, and is then output to the input port of the orthogonal mode duplexer. The local oscillator low-pass filter is configured to prevent the RF signal leaking from the local oscillator port (e.g., by removing components of the RF signal having a frequency below a first predetermined threshold frequency), and the IF low-pass filter is configured to filter out spurious components in the IF signal (e.g., having a frequency below a second predetermined threshold frequency).

Figure 6:
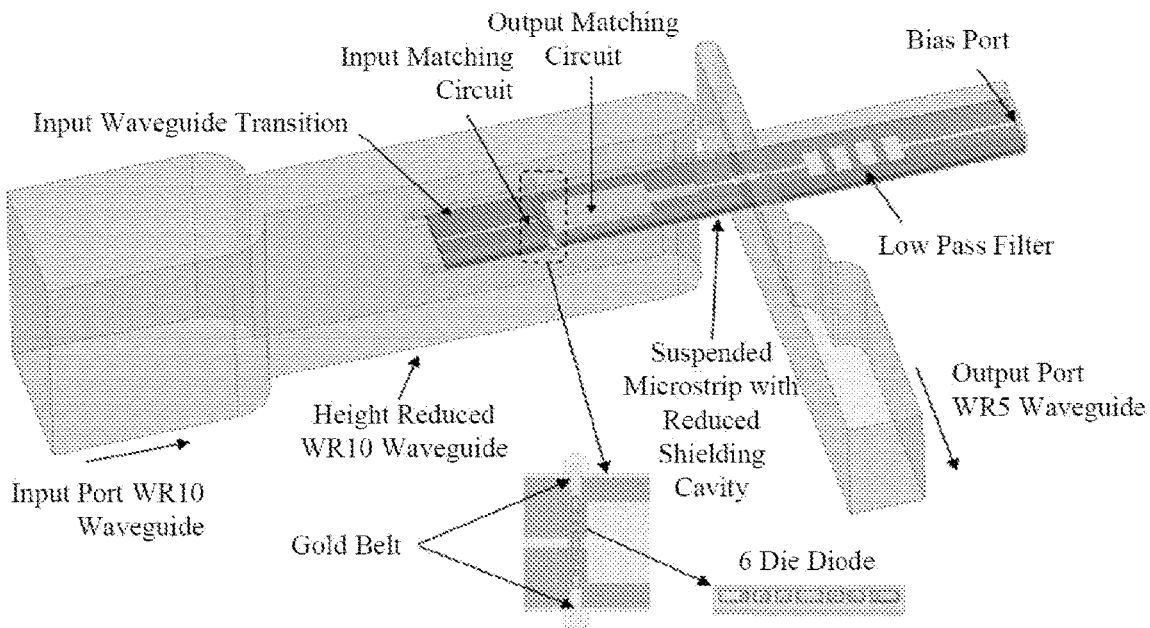
FIG. 6 is a specific circuit structure diagram of an exemplary 220 GHz high-efficiency frequency doubler.

FIG. 6 is a specific circuit structure diagram of an exemplary 220 GHz high-efficiency frequency doubler. The high-efficiency frequency doubler includes an input transition structure, an output transition structure, a Schottky varactor diode, and a bias circuit. The input transition structure comprises an input waveguide, a height-reducing waveguide, an input probe and an input matching circuit. The output transition structure comprises an output matching circuit, a suspended microstrip (e.g., with or in a reduced shielding cavity) and an output waveguide. The bias circuit comprises a low-pass filter (e.g., a bias low-pass filter).

The input waveguide comprises a WR10 waveguide, and the input waveguide is connected with the height-reduced WR10 waveguide. A part (e.g., half) of the suspended microstrip is in the height-reduced WR10 waveguide, and the other part (e.g., half) extends outside the height-reduced WR10 waveguide. The end of the microstrip extending outside the height-reduced WR10 waveguide is a bias port. The center of the suspended microstrip is connected to the output waveguide. The output waveguide comprises a WR5 waveguide. An output matching circuit and a low-pass filter (e.g., the bias low-pass filter) are respectively on opposite sides of the output waveguide. Opposite sides (e.g., an input and an output) of the Schottky varactor diode are respectively configured with (e.g., coupled or connected to) an input matching circuit and an output matching circuit.

A first power signal enters from the local oscillator port of the input waveguide, passes through the height-reducing waveguide and the input probe, then transitions to the input matching circuit, and then couples to the Schottky varactor diode through the input matching circuit for frequency multiplication. The frequency-multiplied signal passes to or through the output matching circuit to the suspended microstrip with or in the reduced shielding cavity, and then couples to the output waveguide (e.g., for output). The low-pass filter is configured to prevent the signal from leaking (e.g., passing through) from the bias port.

Example 1

Figure 7:
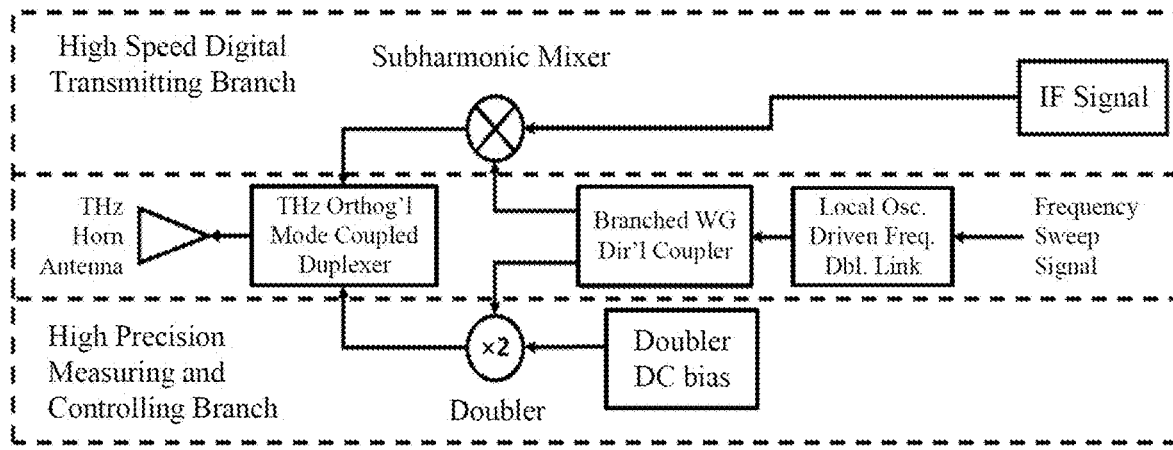
FIG. 7 is an exemplary circuit block diagram for the integration of measurement, control and digital transmission in Embodiment 1 of the present invention.

A terahertz full-duplex co-local oscillator solid-state front-end transmitting circuit can be applied to the integration of measurement, control and digital transmission, as shown in FIG. 7, wherein the first branch of the front-end transmitting circuit comprises a high-speed data transmission link, comprising a local oscillator (LO) driven multiplier (e.g., doubler) link, a branched waveguide (WG) directional coupler, a terahertz subharmonic mixer, a terahertz orthogonal mode coupled duplexer and a terahertz horn antenna, and the second branch of the front-end transmitting circuit comprises a high-precision measurement and control branch, comprising the local oscillator driven frequency multiplier link, the branched waveguide directional coupler, a terahertz doubler, the terahertz orthogonal mode coupled duplexer, and the terahertz horn antenna.

The local oscillator driving signal is a sweep signal (e.g., a frequency sweep signal) for measuring and controlling (e.g., another signal from an external source, an input signal, a sampled signal, etc.). The frequency sweep signal is transmitted to the branched waveguide directional coupler after its frequency is multiplied by the local oscillator driven frequency multiplier link (e.g., a terahertz doubler), and the branched waveguide directional coupler divides the signal and outputs or transmits the divided signals into two channels. A first one of the divided signals has a relatively low power, and it is output to a first channel for the subharmonic mixer, and a second one of the divided signals (e.g., a higher-power local oscillator signal) has a relatively high power, and it is output to another channel for the frequency doubler. The subharmonic mixer (e.g., a terahertz subharmonic mixer) receives and converts an intermediate frequency (IF) signal to the terahertz frequency band, and transmits the mixed low-power and IF signals to the orthogonal mode coupled duplexer and the antenna (e.g., a built-in terahertz horn antenna). The local oscillator driving signal (e.g., the frequency sweep signal) in the measuring and controlling branch (e.g., the higher-power local oscillator signal) is further multiplied to the terahertz frequency band by the terahertz doubler, and the frequency-doubled signal is transmitted to the orthogonal mode coupled duplexer and the antenna (e.g., the built-in or embedded horn antenna).

The orthogonal mode coupled duplexer and the branched waveguide directional coupler highly isolate the two branches, so the two branches can work independently without interfering with each other.

Example 2

Figure 8:
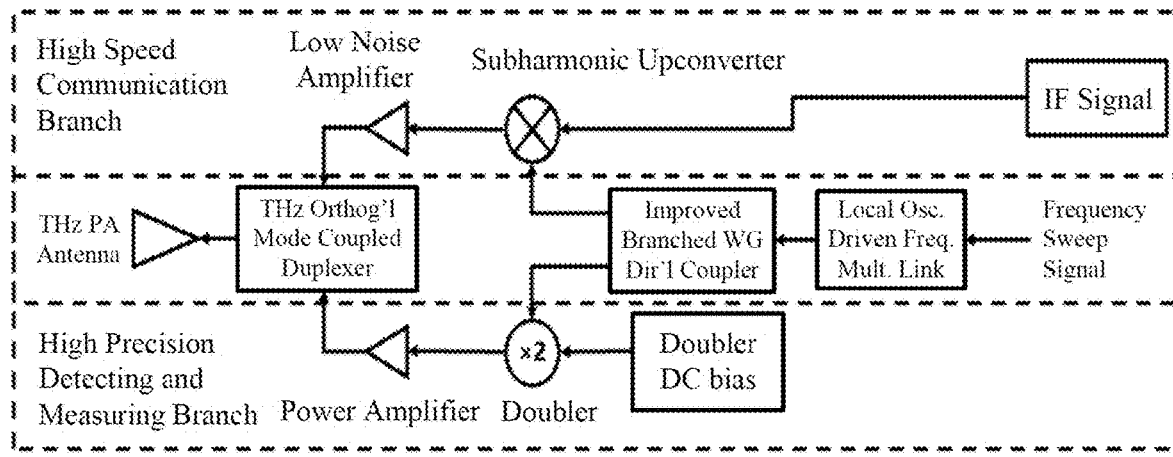
FIG. 8 is an exemplary circuit block diagram for integration of communication and detection in Embodiment 2 of the present invention.

A terahertz full-duplex co-local oscillator solid-state front-end transmitting circuit can be applied to the integration of communication and detection (e.g., of an external signal, an input signal to be communicated between two other devices, a sampled signal, etc.). An exemplary circuit block diagram suitable for this application is shown in FIG. 8. The first branch of the front-end transmitting circuit comprises a high-speed communication branch, comprising a local oscillator driven frequency multiplication link, a branched waveguide (WG) directional coupler, a sub-harmonic upconverter (e.g., a terahertz subharmonic mixer), a low-noise amplifier, a terahertz quadrature mode coupled duplexer and a terahertz phased array (PA) antenna. The second branch of the front-end transmitting circuit comprises a high-precision detection branch, comprising the local oscillator driven frequency multiplication link, the branched waveguide directional coupler, a terahertz doubler, a power amplifier, the terahertz orthogonal mode coupled duplexer, and the terahertz phased array antenna.

The driving signal comprises a sweep signal (e.g., a frequency sweep signal) for detection (e.g., of the external signal, the input signal, the sampled signal, etc.), and the frequency sweep signal is provided to the branched waveguide directional coupler through the frequency multiplication link. The branched waveguide directional coupler provides at the same time a relatively low power driving signal to the subharmonic upconverter (e.g., mixer) and a relatively high power local oscillator signal to the frequency doubler. The subharmonic mixer receives and multiplies an intermediate frequency (IF) signal in the communication branch to the terahertz frequency band, and transmits it through the orthogonal mode coupled duplexer to the antenna. In the detection branch, the frequency doubler further doubles the frequency of the high-power local oscillator driving signal to the terahertz frequency band, which is transmitted through the orthogonal mode coupled duplexer to the phased array antenna.

At the same time, in order to better fulfill the transmission function, the output terminal of the subharmonic mixer can also be connected to a low-noise amplifier, which is configured to amplify the terahertz signal in the communication branch output by the sub-harmonic mixer, and then the amplified signal is transmitted to the orthogonal mode coupled duplexer (e.g., to further expand the working distance [for example, to reduce or eliminate cross-talk or interference] between the communication branch and the detection branch). The output terminal of the frequency doubler can also be connected to a power amplifier, which is configured to amplify the terahertz signal in the detection branch, and then the amplified terahertz signal is transmitted to the orthogonal mode coupled duplexer (e.g., to further extend the working distance of the detection branch).

The above are only some specific embodiments of the present invention. Any feature disclosed in this specification, unless specifically stated, can be replaced by other equivalent or alternative features with similar purposes; all the disclosed features, or all method or process steps may be combined in any way, except for mutually exclusive features and/or steps.

What is claimed:

1. A terahertz full-duplex co-local oscillator solid-state front-end transmitting circuit, comprising:
   a local oscillator tripler having a first output terminal and a first input terminal,
   a branched waveguide directional coupler having a first local oscillator input terminal, a coupling terminal and a through terminal,
   a terahertz subharmonic mixer,
   a terahertz doubler having a third input terminal, a fourth input terminal and a third output terminal,
   an orthogonal mode coupled duplexer having a fifth input terminal, a sixth input terminal and a fourth output terminal,
   a branched waveguide directional coupler, and
   a transmitting antenna; wherein:
     the first output terminal is connected to the first local oscillator input terminal;
     the coupling terminal is connected to the second local oscillator input terminal, and the through terminal is connected to the third input terminal;
     the second output terminal is connected with the fifth input terminal;
     the third output terminal is connected with the sixth input terminal;
     the fourth output terminal is connected with the transmitting antenna;
     the local oscillator tripler is configured to double a frequency of a drive signal from a local oscillator, and then transmit the frequency-doubled drive signal to the branched waveguide directional coupler;
     the branched waveguide directional coupler is configured to divide the frequency-doubled driving signal into a first power signal having a first power and a second power signal having a second power different from the first power;
     the terahertz doubler is configured to receive and multiply a frequency of the first power signal to generate a first branch transmission signal;
     the terahertz subharmonic mixer is configured to receive the second power signal and mix the second power signal with an input intermediate frequency signal to generate a second branch transmission signal; and
     the orthogonal mode coupled duplexer is configured to receive the first branch transmission signal and the second branch transmission signal respectively at the fifth input terminal and the sixth input terminal, combine the first and the second branch transmission signals into a single transmission signal, and provide the single transmission signal to the transmitting antenna.

2. The terahertz full-duplex co-local oscillator solid-state front-end transmitting circuit according to claim 1, further comprising a twisted waveguide connected to one of the fifth and sixth input terminals, so that one of the first and second branch transmission signals has a polarization mode that is mutually orthogonal to the other of the first and second branch transmission signals.

3. The terahertz full-duplex co-local oscillator solid-state front-end transmitting circuit according to claim 1, wherein the second power signal has a power of less than or equal to 4 mW, and the first power signal has a power greater than 100 mW.

4. The terahertz full-duplex co-local oscillator solid-state front-end transmitting circuit according to claim 1, wherein the local oscillator tripler includes (i) a waveguide having a third local oscillator input terminal and (ii) a microstrip line.

5. The terahertz full-duplex co-local oscillator solid-state front-end transmitting circuit according to claim 4, wherein the third local oscillator terminal receives the driving signal, and the waveguide couples the driving signal to the microstrip line.

6. The terahertz full-duplex co-local oscillator solid-state front-end transmitting circuit according to claim 5, wherein the waveguide comprises a WR-28 waveguide.

7. The terahertz full-duplex co-local oscillator solid-state front-end transmitting circuit according to claim 1, wherein the branched waveguide directional coupler comprises an H-shaped waveguide with two primary paths and a central section, each of the two primary paths comprises a rectangular waveguide port, and the rectangular waveguide ports include an input port, a coupling port, a through port and an isolation port.

8. The terahertz full-duplex co-local oscillator solid-state front-end transmitting circuit according to claim 7, wherein the input port is connected with the first output terminal, the coupling port is connected with the second local oscillator input terminal, and the through port is connected with one of the third and fourth input terminals.

9. The terahertz full-duplex co-local oscillator solid-state front-end transmitting circuit according to claim 1, wherein the terahertz subharmonic mixer comprises a radio frequency transition structure, an antiparallel diode pair and a local oscillator duplexer.

10. The terahertz full-duplex co-local oscillator solid-state front-end transmitting circuit according to claim 9, wherein the radio frequency transition structure comprises a radio frequency waveguide, a radio frequency matching circuit, a radio frequency probe, a local oscillator duplexer, a local oscillator waveguide probe, a local oscillator low-pass filter, an intermediate frequency low-pass filter and a local oscillator matching circuit.

11. The terahertz full-duplex co-local resonance solid-state front-end transmitting circuit according to claim 1, wherein the terahertz doubler includes an input transition structure, an output transition structure, a Schottky varactor diode, and a bias circuit.

12. The terahertz full-duplex co-local resonance solid-state front-end transmitting circuit according to claim 11, wherein the input transition structure comprises an input waveguide, a height-reducing waveguide, an input probe and an input matching circuit; the output transition structure comprises an output matching circuit, a suspended microstrip with or in a reduced shielding cavity, and an output waveguide; and the bias circuit comprises a bias low-pass filter.

13. The terahertz full-duplex co-local oscillator solid-state front-end transmitting circuit according to claim 12, wherein each of the input waveguide and the height-reducing waveguide comprises a WR10 waveguide, and the output waveguide comprises a WR5 waveguide.

14. The terahertz full-duplex co-local oscillator solid-state front-end transmitting circuit according to claim 1, wherein the transmitting antenna comprises a horn antenna, the driving signal is a measurement and control frequency sweep signal, the first transmission signal is a terahertz measurement and control signal, the second power signal is a local oscillator driving signal provided by the terahertz subharmonic doubler, and the second branch transmission signal is a terahertz digital transmission signal.

15. The terahertz full-duplex co-local oscillator solid-state front-end transmitting circuit according to claim 1, wherein the transmitting antenna comprises a terahertz phased array antenna, the drive signal is a frequency sweep signal, the first transmission signal is a terahertz detection signal, and the transmission signal of the second branch is a terahertz communication signal.

16. The terahertz full-duplex co-local oscillator solid-state front-end transmitting circuit according to claim 1, further comprising a power amplifier and a low noise amplifier.

17. The terahertz full-duplex co-local oscillator solid-state front-end transmitting circuit according to claim 16, wherein the power amplifier and the terahertz doubler are connected to the terahertz orthogonal mode coupled duplexer, and the power amplifier is configured to amplify and process a frequency-multiplied output signal from the terahertz doubler, and the terahertz orthogonal mode coupled duplexer is configured to receive the frequency-multiplied output signal from the power amplifier.

18. The terahertz full-duplex co-local oscillator solid-state front-end transmitting circuit according to claim 16, wherein the low noise amplifier is connected with the terahertz subharmonic mixer and the terahertz orthogonal mode coupled duplexer, and the low noise amplifier is configured to amplify the second branch transmission signal, and the terahertz orthogonal mode coupled duplexer is configured to receive an amplified output signal from the low noise amplifier.

* * * * *